Oct. 28, 1947.  W. G. ABRAHAM  2,429,595
AUTOMATIC LANDING SYSTEM
Filed Sept. 3, 1943  3 Sheets-Sheet 1

INVENTOR
WAYNE G. ABRAHAM
BY
ATTORNEY

Oct. 28, 1947.  W. G. ABRAHAM  2,429,595
AUTOMATIC LANDING SYSTEM
Filed Sept. 3, 1943  3 Sheets-Sheet 3

INVENTOR
WAYNE G. ABRAHAM
BY
ATTORNEY

Patented Oct. 28, 1947

2,429,595

UNITED STATES PATENT OFFICE 2,429,595

AUTOMATIC LANDING SYSTEM

Wayne G. Abraham, East Hempstead, N. Y., assignor to Sperry Gyroscope Company, Inc., a corporation of New York Application September 3, 1943, Serial No. 501,051

19 Claims. (Cl. 250—11)

My invention relates to aircraft landing systems.

An object of the invention is to provide improved methods and systems for landing aircraft.

A further object is to provide an arrangement for guiding aircraft to a landing beam.

Still another object is to provide an arrangement for reducing congestion at crowded airports and for causing orderly approach and landing of aircraft.

Still another object is to provide arrangements for automatically landing aircraft approaching a landing field from a distance.

A more specific object of the invention is to provide arrangements for aircraft landing systems which automatically shift the apparatus from beam finding to glide-path and localizer-path flying.

Other and further objects and advantages of the invention will become apparent as the description proceeds.

In accordance with my invention in its preferred form, I utilize an aircraft landing system of the type which has already been proposed, having localizer and glide path beams. In addition to such equipment, I provide arrangements for guiding the aircraft to the proper point for flying in on the localizer beam regardless of the direction from which the aircraft approaches the landing field. To this end, I provide an auxiliary transmitter which radiates energy of substantially equal strength in all directions from the landing field. Furthermore, I provide mechanism on the aircraft which is responsive to the strength of radiation of such a circular pattern or auxiliary transmitter and causes the aircraft to fly on a track in which the signal strength from such a transmitter is constant. Thus, the aircraft is caused to fly along a substantially circular path. A relay is provided for bringing the automatic landing apparatus into operation as soon as the aircraft has flown along the circular path to the point at which the circular path intersects the localizer beam. The relay mechanism is so arranged as to discontinue the constant-intensity signal or circular course operation and convert the apparatus for response to the glide path and localizer beams.

A better understanding of the invention will be afforded by the following detailed description when considered in connection with the accompanying drawings, in which.

Like reference characters are utilized throughout the drawings to distinguish like parts.

Figure 3:
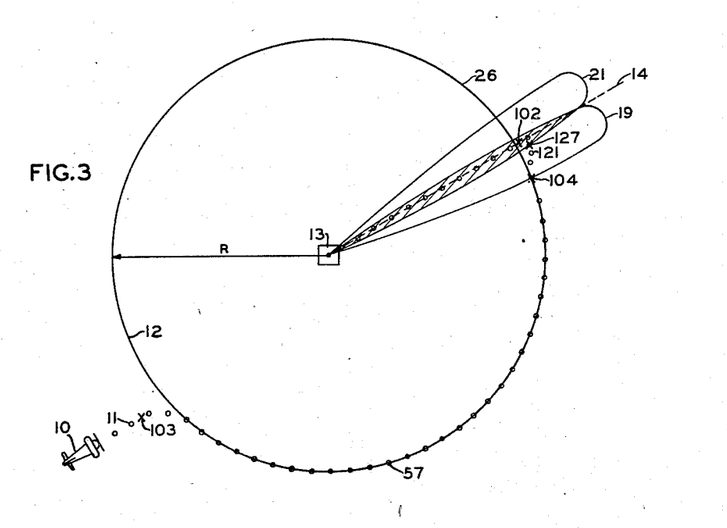
Fig. 3 is a diagram representing a plan view of an airport and the path of approach of an aircraft operated in accordance with the landing system in which the apparatus of Figs. 1 and 2 is used.

The apparatus of the illustrated embodiments comprises mechanism for causing an airplane 10 to fly along the path represented by the heavy dotted line in Fig. 3 or for enabling the pilot to pilot the airplane along such a path. The mechanism includes means which remain unresponsive as long as an aircraft is flying in from a considerable distance along the straight line 11, and which thereafter gives a proper indication to cause the aircraft to turn in a predetermined direction, for example, to the right, when it reaches the circumference of a circle 12 having a fixed radius, such as twenty miles, with an airport or landing field 13 as the center of the circle 12. Mechanism is also included for causing the aircraft to travel along the circumference of the circle 12 until it reaches a landing path 14 which is provided with suitable glide path and localizer beams for enabling the aircraft to descend from the proper direction and at the proper angle to make a smooth landing automatically or by blind flying with instruments alone.

Figure 2:
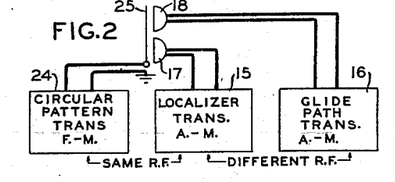
Fig. 2 is a schematic block diagram of transmitting apparatus located at a landing field for use with the aircraft apparatus of Fig. 1.
Figure 4:
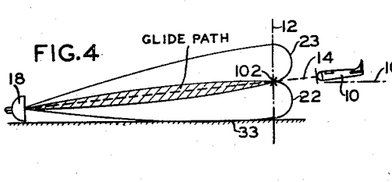
Fig. 4 is a diagram representing an elevation view of an aircraft approaching a landing field and the glide path along which the aircraft is intended to descend.
Figure 5:
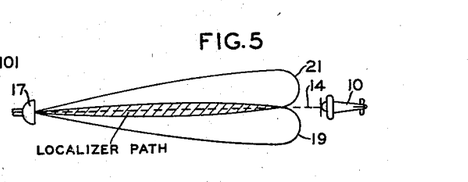
Fig. 5 is a plan view representing an approaching aircraft, the localizer path defining the vertical plane in which the aircraft is intended to travel while descending.

Referring to Fig. 2, an aircraft landing system which has been proposed includes a localizer transmitter 15 and a glide path transmitter 16 with suitable narrow-beam antennas or radiators 17 and 18, respectively, for producing the localizer and glide path beams 19, 21 and 22, 23 represented in Figs. 5 and 4, respectively. This part of the mechanism serves for causing the aircraft to descend along the landing path 14 of Fig. 3.

Figure 6:
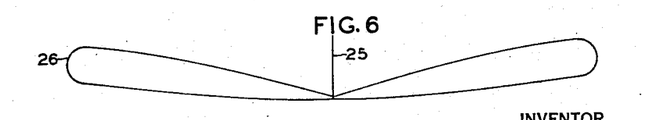
Fig. 6 is an elevation view of the distribution curve of the radiation from the auxiliary transmitter employed in the apparatus of Figs. 1 and 2.

To supplement the foregoing mechanism and cause the airplane to fly along the desired portion of the circumference of the circle 12, I provide a circular pattern transmitter or auxiliary transmitter 24 (Fig. 2). The transmitter 24 is provided with a suitable antenna or radiator 25 which produces signals of substantially equal strength in all directions. In Fig. 2 a simple vertical quarter wave or Marconi antenna is shown, but it will be understood that suitable modifications thereof may be employed in order to maintain the radiated energy as close to the horizon as possible, for the sake of maximum efficiency and minimum interference. A desirable vertical radiation pattern 26 is illustrated in Fig. 6.

Figure 1:
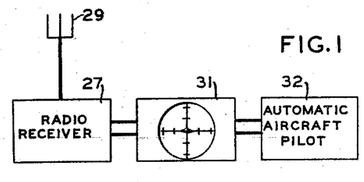
Fig. 1 is a schematic block diagram of receiving apparatus which may be carried by an aircraft in accordance with one embodiment of my invention.

Aircraft intended for automatic landing along a landing path, such as the path 14 shown in Fig. 3, may be provided with a suitable receiver represented by a box 27 in Fig. 1, having an input from an antenna 29 and having outputs supplied to a cross-pointer instrument 31 or to an automatic aircraft pilot 32, preferably with outputs supplied to both elements 31 and 32. Receiving equipment has heretofore been proposed for enabling a plane to descend along a landing path such as the path 14 of Fig. 3, by operating in response to the transmitters 15 and 16 of Fig. 2. Such receiving equipment on the aircraft with certain modifications and additions may be employed in connection with the modified transmitting equipment, illustrated in Fig. 2. Relay mechanism is added to the receiver 27 for causing the receiving apparatus to change its response from the circular transmitter 24 to the localizer transmitter 15 and from a constant altitude reference to the glide path transmitter 16 at the proper instant, and certain other modifications in previously proposed automatic landing receivers are made to enable the apparatus to respond initially to the circular transmitter 24 and to maintain a fixed level of flight until the descent along the landing path 14 is begun.

The localizer transmitter 15, represented in Fig. 2, comprises means for generating radio frequency oscillations or a carrier wave at a relatively high frequency, such as 2617 megacycles, for example, and for transmitting radio frequency energy along two narrow beams in radiation patterns 21 and 19, as illustrated in Fig. 5. Means (not shown) are provided for modulating the two beams at two different audio frequencies, for example, 900 cycles and 600 cycles. The localizer beams serve for demarcation of a vertical equisignal localizer plane through the landing path 14. Similarly, the glide-path transmitter 16 comprises means (not shown) for generating radio frequency oscillations at a different carrier frequency, for example, 2640 megacycles, projecting the waves in two narrow beams 22 and 23 (Fig. 4), and modulating the beams at two different audio frequencies such as 600 and 900 cycles, respectively. The glide-path beams serve for demarcation of an inclined equisignal glide-path plane through the landing path 14. The beams 19, and 21, 22, and 23 are horizontally polarized and accordingly the receiver antenna 29 (Fig. 1) is arranged for reception of horizontally polarized waves as well as vertically polarized waves. If desired the antenna 25 of the circular pattern transmitter 24, may be of such a type as to radiate horizontally polarized waves, in which case the receiving antenna 29 need receive only horizontally polarized waves. The radiators 17 and 18 are so oriented that the beams 19, 21, 22, and 23 make a low angle with the ground or the surface 33 of the landing field.

The circular-pattern transmitter or auxiliary transmitter 24 in the embodiment of Fig. 2 includes a generator (not shown) for supplying radio frequency energy at the same frequency as the localizer transmitter 15, in this case 2617 megacycles.

In order not to distort the waves supplied from the transmitters 15 and 16 by producing interference patterns, the transmitter 24 is preferably frequency modulated. The frequency deviation is so chosen, however, that the deviation does not exceed the pass band I.-F. channel of the receiver 27 (Fig. 1).

Figure 7:
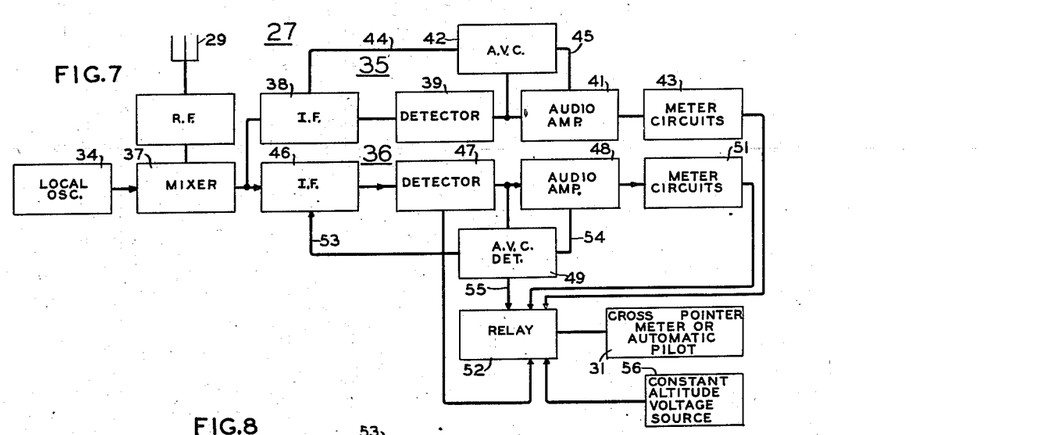
Fig. 7 is a block diagram of the component parts of a receiver in accordance with one embodiment of my invention.

The receiver 27, as illustrated in Fig. 7, comprises what may be called a composite or dual-frequency receiver of the superheterodyne type with a common local oscillator 34 and two channels 35 and 36 having intermediate-frequency inputs at different frequencies. The radio frequency stages are designed for a sufficiently wide pass band to receive the carriers of both transmitters 15 and 16 (Fig. 2). Accordingly a common mixer 37 may also be employed, having an input connection from the antenna 29 and the local oscillator 34. Both the intermediate-frequency-input channels 35 and 36 are supplied by the mixer 37. The channel 35 is tuned to respond selectively to signals from the glide path transmitter 16. The channel 36 is tuned to respond selectively to the localizer transmitter 15. The local oscillator 34 has a frequency closer to the frequency of one of the transmitters 15 and 16 than to the other in order that beat frequencies may be segregated. With the transmitter frequencies assumed e. g., the oscillator frequency may be 2633 megacycles, in which case the intermediate-frequency stage of the channel 35 will be tuned to pass the 7 megacycle band and the intermediate-frequency stage of the channel 36 will be tuned to pass the 16 megacycle band.

The glide-path channel 35 comprises an intermediate-frequency amplifier 38, signal detector 39, and audio amplifier 41, and an AVC detector 42 supplied by the detector output and connected to control the audio level in addition to the intermediate-frequency level. Suitable meter circuits 43 are provided for supplying a direct current output to the glide path winding of the cross-pointer instrument 31 or the automatic aircraft pilot 32.

The AVC detector 42 is shown with an AVC line or output connections 44 and 45 to both the intermediate-frequency amplifier 38 and the audio amplifier 41. The connection 45 to the audio amplifier 41 serves for course broadening close to the airport.

The portions of the receiver thus far described employ features similar to those described in Patent No. 2,307,023 Cooke et al., relating to a method and apparatus for landing aircraft along a glide-path. Although this portion of the apparatus as described differs in some respects from that described in the aforesaid Cooke et al. patent, this portion of the apparatus need not be described in detail since my invention does not relate primarily thereto.

The localizer channel 36 is responsive to the localizer beams of the transmitter and is somewhat similar to the glide-path channel 35 but includes additional elements. Like the channel 35, the channel 36 includes an intermediate-frequency amplifier 46, a signal detector 47, an audio amplifier 48, and AVC detector 49, and meter circuits 51. The detector 47 has certain modified features which will be described more in detail hereinafter, and the channel 36 has associated therewith also a relay 52 responsive to the output of the AVC detector 49. The AVC detector 48 has output connections 53, 54, and 55, respectively, to the intermediate-frequency amplifier 46, the audio amplifier 48, and the relay 52. A constant-altitude reference voltage source 56 is also provided. The relay 52 is so arranged that it will operate in response to the AVC detector 49 for either connecting the cross pointer meter 31 and the automatic pilot 32 to the glide-path and localizer meter circuits 43 and 51 or to the detector 47 and the constant-altitude reference-voltage 56.

The detector connections are such that the localizer pointer of the cross-pointer instrument 31 gives a straight ahead or neutral indication for a predetermined strength of signal reception from the circular-pattern transmitter 24, when the relay 52 is in the constant-intensity course position. Furthermore the cross-pointer indicator gives "fly-left" indication for weaker signals and "fly-right" indications for stronger signals (or vice-versa if desired). For this reason the pilot is enabled to fly a circular path along the circumference of the circle 12 when flying by instruments and an automatic pilot takes the aircraft along such a track when the automatic pilot is used.

The apparatus is so arranged that the aforesaid predetermined signal intensity or one substantially greater is insufficient to operate the AVC detector 49. Moreover, the relay is so arranged that when it is not energized by the AVC detector 49, the cross pointer meter or automatic pilot has its glide path winding connected to the constant altitude reference voltage source 56 and its localizer winding connected to the detector 47.

The pilot causes the airplane to travel a circular path in the portion 57 of the circle 12 by maintaining the localizer pointer of the cross pointer meter 31 at its center indication. The plane is kept at constant altitude by causing the glide-path pointer to remain at its center indication. It is assumed that the apparatus is so adjusted that for weak signals a "fly left" indication is produced and for strong signals a "fly right" indication is produced, which results in the circular path 12 being flown by circling to the left. When the airplane enters the region of the localizer beams 19 and 21, the energy received by the receiver rises to such a value that the AVC detector 49 operates and switches the relay 52 causing the cross pointer meter 31 and the automatic pilot 32 to be connected to the meter circuits 43 and 51. The airplane then no longer follows the constant intensity or circular course and proceeds along the equi-signal or landing course 14. The operation of landing by flying along the course 14 utilizes the localizer and glide path signals and proceeds in a manner which has been heretofore proposed and does not constitute my present invention.

Figure 8:
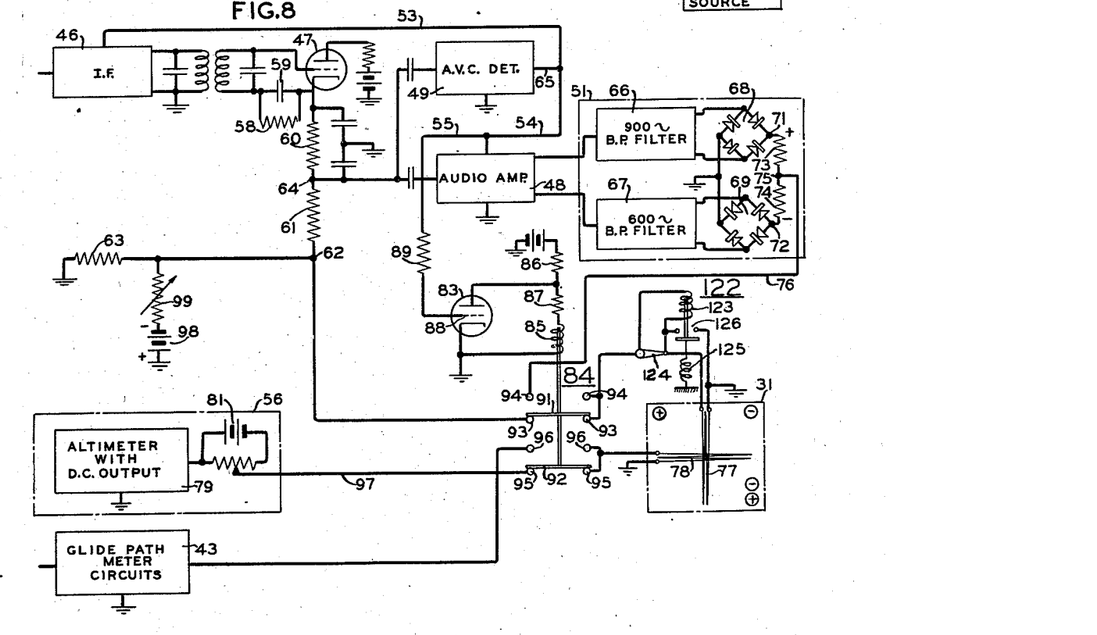
Fig. 8 is a schematic diagram and fragmentary circuit diagram of a portion of the apparatus of 7, showing certain elements in greater detail.

Although my invention is not limited to specific arrangements of the internal elements of the component parts shown in Fig. 7, satisfactory operation may be obtained by utilizing the arrangement illustrated in Fig. 8. In Fig. 8 the glide-path channel 35 and the portions of the receiver directly related to glide path control are not shown, as my invention relates more directly to the portions of the receiver responding to the localizer beam. The detector 47 may comprise a triode vacuum tube connected as a grid leak detector with conventional transformer coupling to the intermediate frequency amplifier 46, and a grid-leak resistor 58, shunted by a grid condenser 59 included in the grid circuit. The cathode circuit includes a by-passed filter resistor 60, an output or load resistor 61, and means for closing the circuit to ground. The lower end 62 of the load resistor 61 has alternate ground connections through a grounding resistor 63 and through contacts of the relay 52, which will be described in greater detail hereinafter. The output terminal of the detector 47 is a junction terminal 64 between the resistors 60 and 61. The terminal 64 is capacity coupled to the AVC detector 49 and also to the audio amplifier 48. The output of the AVC detector 49 is connected to a conventional AVC line 65.

The localizer meter circuits 51 include two band pass filters passing two different audio frequencies, for example, a 900-cycle filter 66 and a 600-cycle filter 67. The filters 66 and 67 have output connections to full wave rectifiers 68 and 69, and the rectifiers 68 and 69 are so connected as to supply direct current outputs of opposite polarity with respect to ground. For example, the rectifiers 68 and 69 may each have a grounded terminal and may have positive and negative terminals 71 and 72 respectively. Resistors 73 and 74 are connected in series between terminals 71 and 72 and have a junction terminal 75 adapted to be connected through a conductor 76 to the cross pointer meter 31 or an automatic pilot.

The cross pointer meter 31 has a localizer winding 77 adapted to cause a vertical pointer (not shown in Fig. 8) to travel to the right or to the left in response to negative or positive current, and has a glide-path winding 78 which causes a horizontal pointer (not shown) to travel up or down in response to negative or positive current. If the automatic pilot is utilized instead of the cross pointer instrument or if both such devices are employed, the automatic pilot will likewise have a localizer winding and a glide path winding corresponding to windings 77 and 78 each connected in series or shunt to the like winding of the cross pointer meter. In the grounded system as illustrated each winding 77 and 78 may be grounded on one side.

The constant altitude reference voltage source 56 may comprise a conventional arrangement for producing voltage which fluctuates from a fixed voltage in response to deviations of the aircraft from a predetermined altitude or for producing voltage or current which changes its polarity in response to deviations from a predetermined altitude. Such a mechanism has heretofore been proposed for use in connection with automatic flight at a fixed altitude. A form of such a mechanism is represented schematically in Fig. 8 by a rectangle 79 representing an altimeter for producing direct current proportional to altitude, and an altitude adjusting bias voltage source 81 which produces voltage of suitable magnitude to reduce the output of the altimeter 79 to zero at a predetermined altitude. In the illustrative case it is assumed that altimeter 79 supplies a positive voltage and the altitude adjusting source 81 a negative voltage.

The relay apparatus 52 comprises a relay amplifying tube 83 and an electromagnetic relay 84 having an operating winding 85.

The tube 83 has a load circuit comprising a resistor 86 in series with the tube and a resistor 87 connected in series with the relay winding 85 across the tube. There is a control grid 88 connected in series with a resistor 89 and the conductor 55 to the AVC line 65.

The relay 84 comprises a pair of movable contacts 91 and 92 and associated stationary contacts. Cooperating with the contact 91 are normally closed stationary contacts 93 and normally open stationary contacts 94. Cooperating with the movable contact 92 are a pair of normally closed stationary contacts 95 and a pair of normally open stationary contacts 96.

The normally closed contacts 93 are connected between the localizer winding 77 of the cross pointer meter 31 and the ground-end terminal 62 of the load resistor 61 of the detector 47. The normally open contacts 94 are connected between the localizer winding 77 and the conductor 76 leading from the output terminal 75 of the localizer-meter circuits 51.

The normally closed contacts 95 are connected between the glide path winding 78 of the cross pointer meter 31 and an output conductor 97 of the constant altitude reference voltage source 56. The normally open contacts 96 are connected between the glide path meter circuits 43 and glide path winding 78.

For neutralizing the current normally flowing through the detector 47, a bias-current source 98 is provided, which has a grounded positive terminal and a negative terminal connected through a resistor 99 to the ground end terminal 62 of the detector output resistor 61.

The strength of the current-source 98 and the resistance of the resistor 99 are so chosen that when the aircraft 10 is on the circumference of the circle 12 (Fig. 3) the opposing current supplied by the source 98 to the localizer winding 77 equals that supplied from the detector 47. Accordingly when the relay 52 is de-energized and the contacts 93 remain closed, zero current will flow through the winding 77 so long as the aircraft is on the circumference of the circle 12.

Owing to the fact that the detector 47 is of the grid leak type, increasing strength of the radio frequency carrier signal received from the circular-pattern transmitter 24 (Fig. 2) will result in decreasing direct current through the detector 47 and vice versa. Accordingly, if the aircraft turns toward the airport 13 in the center of the circle 12, causing the intensity of the radio frequency signal to increase, the current flow through the winding 77 will decrease causing it to deflect to the right and produce a "fly right" indication. On the other hand, if the aircraft turns away from the circle 12 and flies into a region of less than the predetermined signal intensity, the positive current supplied to instrument winding 77 will increase, causing left-hand deflection and a "fly left" indication will be produced.

In a similar manner the current through the glide path winding 78 will reverse the polarity in case the aircraft flies above or below the altitude set by the altitude adjustment 81.

Referring to Fig. 4, a fixed altitude for which the unit 81 may be adjusted is that intersecting the glide path line 14 at a distance from the airport equal to the radius of the circle 12. The altitude of the airplane while approaching circle 12 and flying on the course 57 is therefore represented by the horizontal line 101 in Fig. 4.

Referring to Fig. 3 when the aircraft has flown into the region represented by the localizer beams 19 and 21, radio frequency energy from the beams 19 and 21 picked up by the receiver will cause the operation of the AVC detector 49 supplying negative voltage to the control grid 88 of the tube 83 (Fig. 8). The tube 83 is normally conducting and serves as a partial short circuit for the winding 85. When a negative potential from the AVC detector 49 is applied to the control grid 88, the tube 83 becomes non-conducting, the plate potential rises and causes sufficient current to flow through the control winding 85 to lift the contacts 91 and 92, thereby closing the stationary contacts 94 and 96 and opening the stationary contacts 93 and 95.

The localizer winding 77 of the cross pointer instrument is then connected to the localizer meter circuits 51 and the glide-path winding 78 is connected to the glide-path circuits 43. This is the standard connection of an aircraft landing system which has heretofore been proposed. The airplane thereupon ceases to fly along the arcuate path 57 but descends along the landing path 14. It will be understood that in this operation deviation of the aircraft from the glide path will result in greater intensity of either the 600 or the 900 cycle modulated signal from the glide path transmitter 16, producing direct current output from the glide path circuits 43 of one polarity or the other to deflect the glide path winding 78 to either "fly-up" or "fly-down" position. Likewise any deviation from the localizer path will cause current flow of such polarity through the localizer winding 77 as to produce the requisite "fly left" or "fly right" indication.

My arrangement for bringing the aircraft 10 along the arcuate path 57 to the proper point 102 for flying the landing path 14 may be utilized either in connection with instrument flying of the airplane controlled by a human pilot or in connection with automatic flying of an aircraft controlled by an automatic pilot. If the aircraft is controlled by a human pilot rather than an automatic pilot, the pilot brings the aircraft 10 into the vicinity of the airport 13, that is, within approxmately 20 miles thereof, by flying either by a radio beacon beam or by dead reckoning, and then turns on the flight indication apparatus. This apparatus is turned on when the aircraft is outside the circle 12 at a point 103, for example (Fig. 3). A "fly left" indication will be obtained because the aircraft is in the region where the strength of the signal from the circular path is below the predetermined constant intensity. The pilot, however, disregards this indication until the localizer pointer changes to "fly straight ahead" moving toward the "fly-right" indication, whereupon the pilot turns in to the arcuate path 57. Thereafter a deviation from the arcuate path will cause a "fly left" or "fly right" indication, and the pilot will maneuver the airplane in such a manner as to maintain the localizer indication at the center of the dial or the "fly straight ahead" indication.

Simultaneously the pilot controls the altitude so as to maintain the glide path indicator at the center indication, indicating that the plane is flying in a plane 101 (Fig. 4). When the pilot reaches the point 104, (Fig. 3), the outer intersection of the beam 19 and the arcuate path 57, the AVC detector 49 will function, switching the relay 52 to the landing connection for flying along the landing path 14. Owing to the fact that the aircraft is then in the beam 19, which is to the left of the landing path 14 (Fig. 3), a "fly right" indication will be obtained, but the pilot disregards this indication until reaching the point 102 at which this indication changes to a "fly left" indication, whereupon the pilot turns to the left and flies in along the localizer and glide path beams, maintaining both localizer and glide path indications at the center of the instrument scale.

Similar operation takes place if the aircraft is under the control of an automatic pilot, for the reason that an automatic pilot includes rate circuits. These rate circuits are mechanisms for decreasing the tendency to correct the deviation from the proper path when the deviation is decreasing and for increasing the tendency to correct the deviation when the deviation is increasing. In other words, the rate circuits include means for adding a first derivative, or perhaps higher derivatives as well, to the error indication. The rate circuits therefore tend to carry the aircraft through the regions from the point 103 to the circle 12 and from the point 104 to the point 102 without excessive deviation from the desired course as a result of the indications which would have been disregarded by the human pilot when the "fly left" indication was received from the point 103 when the apparatus was turned on until the circule 12 was reached and when the "fly right" indication was received between the points 104 and 102.

Figure 11:
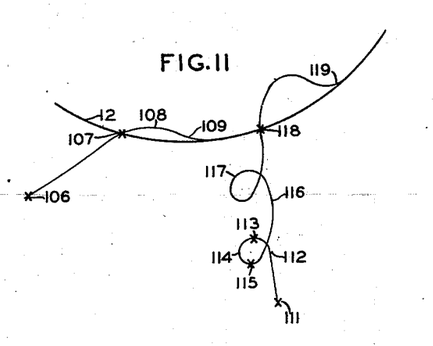
Fig. 11 is a diagram corresponding to Fig. 3, explanatory of the operation under certain conditions.

Referring to Fig. 11, assuming that the airplane is being flown in such a direction as to approach the circle 12 tangentially the apparatus may be turned on when the aircraft is at a point 106. Since the aircraft is then outside the circle 12, a "fly left" indication will be obtained and the aircraft will tend to fly along a course curving gradually to the left. However, since the aircraft is approaching closer to the center of the circle 12, the "fly left" indication will be decreasing in strength and the rate circuits will progressively decrease the tendency for the aircraft to fly left. The path will become less and less curved until the aircraft crosses the circle 12 at the point 107. Thereupon the "fly right" indication will be produced and the aircraft will turn to the right along the portion 108 of the curve. Since the "fly right" indication will decrease in strength as the aircraft approaches closer and closer to the curve 12, the path of the aircraft will become asymptotic to the circle 12 as shown at 109.

Obviously care must be taken not to turn the apparatus on while the aircraft is at a considerable distance from the airport since a continuous "fly left" indication would then be obtained causing steady circling, and the aircraft would never reach the airport. However, if the automatic apparatus should be turned on when the aircraft is sufficiently close to the airport and to the circular pattern transmitter 24 to produce perceptible variation in the strength of the radio frequency energy picked up as the aircraft flies along, the automatic pilot will bring the aircraft into the arcuate path 57 of Fig. 3. If the apparatus should be turned on when the aircraft is flying directly toward the airport 13 from a point 111, for example, (Fig. 11) a "fly left" indication will be produced which will cause the aircraft to swerve to the left along a path 112 away from the direction toward the airport. Owing to the effect of the rate circuits and the fact that the "fly left" indication decreases in strength somewhat as the aircraft approaches the circle 12, the curve 112 will diminish somewhat in sharpness until the aircraft reaches a point 113 at which it actually begins to fly away from the airport and the signal intensity will progressively decrease in strength. Since the "fly left" indication is then increasing in strength, the rate circuits in the automatic pilot will further strengthen the "fly left" indication and cause the aircraft to execute a sharp turn to the left along the portion 114 of the curve. As soon as the aircraft reaches the point 115 it again turns toward the airport 13 and travels along a gradual curve 116. One or more additional loops 117 may be executed before the aircraft reaches the circle 12. It will be observed, however, that whenever the aircraft is flying toward the airport the rate circuits will cause the plane to travel along a gradual curve. However, whenever the aircraft is flying away from the airport it will fly along a sharp curve so that the aircraft will travel a sort of cycloidal path bringing it closer and closer to the circle 12. If the aircraft intersects the circle 12 at a sharp angle, as at 118, it may tend to overshoot the circle 12 but a "fly right" indication will bring the aircraft around and the rate circuits will turn the path asymptotically toward the circle 12 as shown at 119. Thereafter the aircraft will fly along the arcuate path 57 as shown in Fig. 3.

When the aircraft reaches the point 104 a "fly right" indication obtained from the beam 19 will tend to cause the automatic pilot to turn the aircraft to the right but the rate circuits will hold down this effect, because the "fly right" indication will decrease very rapidly in strength owing to the narrowness of the beam 19. Consequently the aircraft will swerve but slightly to the right as shown at 121, swing around the point 102, and then proceed down the landing path 14 in accordance with the operation of automatic landing systems which have heretofore been proposed.

In order to make it unnecessary for the pilot to keep the apparatus turned off until the circle 12 is approached and to avoid the possibility of executing loops 114 and 117 as shown in Fig. 11 in case the apparatus should be turned on too soon, mechanism may be provided for de-energizing the localizer winding 77 continuously until the circle 12 is approached. For example, as shown in Fig. 8, a relay 122 may be provided which has a winding 123 connected across the terminals of a single throw switch 124 which is open when the relay 122 is to be employed. The switch 124 is in series with the localizer winding 77 and the relay 122 has a biasing spring 125 for keeping it open until the strength of the "fly left" indication from the detector 47 normally supplied to the winding 77 reaches a predetermined value. The relay 122 includes normally open contacts 126 which are connected across the winding 77 for by-passing the winding 77 and grounding the point 62 of the detector 47 through the relay winding 123 whenever the current through the winding 123 exceeds a predetermined value. Since the "fly left" indication is strongest the farthest the plane is away from the airport, the relay 122 may be adjusted to cut out the winding 77 until the "fly left" indication has fallen to a value exceeding slightly the value obtained when an airplane is at the circumference of the circle 12.

When the switch 124 is open and the relay 122 is employed, a strong current normally flowing through the detector 47 when no radio frequency signal is received, will produce a strong current through the relay winding 123, closing its contact 126 and short circuiting the localizer winding 77 so as to prevent the receiver 27 from producing either a "fly-right" or a "fly-left" indication. Since the relay 122 drops out as soon as the aircraft approaches the circle 12 the automatic pilot then takes control of the plane and turns it into the arcuate path 57.

Figure 9:
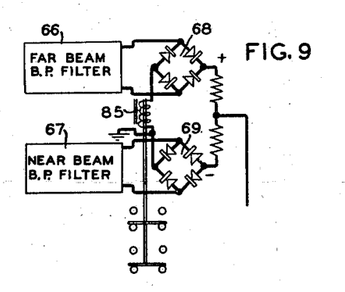
Fig. 9 is a fragmentary diagram of a modification in the arrangement of Figs. 7 and 8.

If desired the relay apparatus 52 may be connected in the output side of the band pass filter corresponding to the far localizer beam 21 in order to prevent the relay 84 from switching the apparatus to automatic landing until the plane has reached the point 102 (Fig. 3). In the case assumed and illustrated in Figs. 3 and 5, the far beam is that modulated at 900 cycles per second. The audio signals from this beam are passed by the 900 cycle band pass filter 66. Referring to Fig. 9, the circuit of Fig. 8 may be modified by omitting the relay tube 83 and connecting the electromagnetic relay winding 85 in series with the output of the rectifier 68, which is energized by the band pass filter 66. Referring to Fig. 5 it will be observed that the 900 cycle beam 21 extends to the left as well as to the right of the landing path or localizer path 14 and therefore the relay coil 87 will be energized as soon as the aircraft travels along the arcuate beam 57 to the point 127 (Fig. 3). Thereupon the relay 84 will pick up, transferring the connections of the localizer and glide path windings 77 and 78 to the meter circuits 51 and 43 (Fig. 8), causing the automatic pilot to take the plane down to the landing field 13 along the landing path 14.

Although I have described the use of my aircraft control and guiding system for bringing an aircraft to a suitable point for descending along a glide path and localizer beam of a landing system, it will be understood that my invention is not limited to the specific arrangement described. For example, the constant intensity system may be employed for avoiding congestion at airports by causing aircraft to remain in separate predetermined paths while awaiting signals to approach for a landing, or for keeping aircraft in air in readiness for immediate departure while awaiting flying orders. If desired, separate transmitters having different frequencies may be provided at different points for causing aircraft to circle these separate points, or the apparatus may be so adjusted in each aircraft that several different aircraft will fly along different concentric circles around a fixed circular-path transmitter. The adjustment of the receivers may be accomplished by selecting suitable adjustment of constants. For example, the resistor 99 shown in Fig. 8 may be adjustable to different values for causing an aircraft to circle on different predetermined radii according to the adjustment of the resistor 99.

In the arrangement illustrated in the figures of the drawings thus far described, the circular pattern transmitter 24 has the same radio frequency as the localizer transmitter 15. Although this arrangement has the advantage that only one radio receiver is required on the aircraft, thus reducing the weight of apparatus, my invention is not limited to the specific arrangement thus far described. For example, if desired, the transmitter 24 may have an entirely different radio frequency from either of the transmitter 15 and 16, in which case the transmitter 24 need not be frequency modulated to prevent interfering with the beams of the transmitters 15 and 16, but a separate receiver will be required for reception from the transmitter 24.

Relay apparatus similar to the relay apparatus 52 of Figs. 7 and 8 may be employed, however, for switching the localizer windings 77 from the detector of such an additional receiver to the landing-path receiver 27 when the aircraft has reached the landing path 14.

If it is desired to avoid using an additional receiver but to operate the circular pattern transmitter 24 at a different frequency from the receivers 15 and 16, the frequency of the transmitter 24 should be chosen close enough to the frequencies of the transmitters 15 and 16 so that it will fall within the pass band of the receiver 27. Furthermore, means should be provided for maintaining a fixed difference in frequency between the transmitter 24 and the localizer transmitter 15 so that if any drift in frequency takes place, both frequencies will drift the same amount and the transmitters 24 and 15 will not react upon one another to distort the localizer beams.

Figure 10:
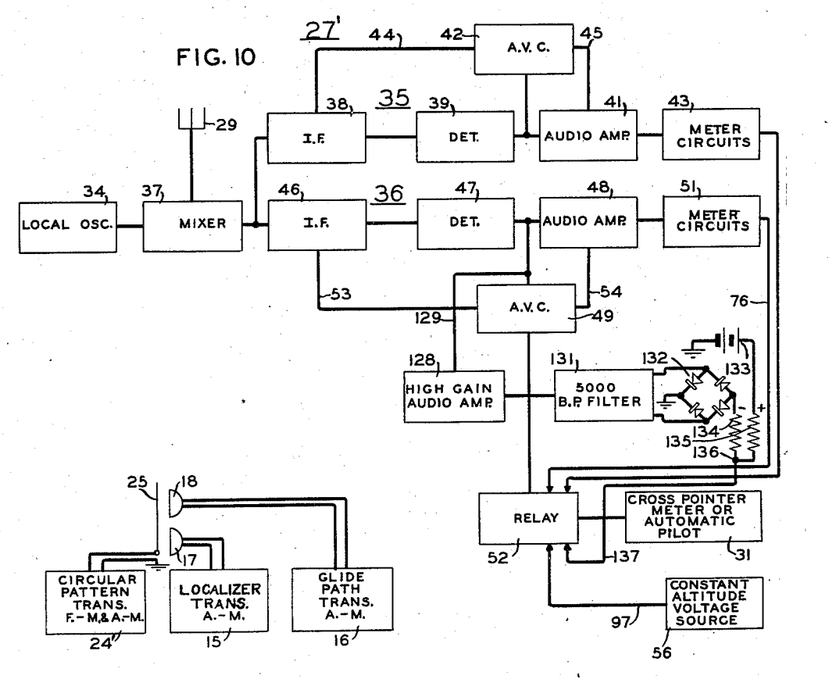
Fig. 10 is a schematic diagram of an instrument landing system which is a modification of the system represented by Figs. 2 and 7.

Although I have described an arrangement in which the radio frequency energy of the transmitter 24 if picked up directly has no signal modulation thereof, my invention is not limited to the use of an un-modulated circular pattern transmitter. If desired, the transmitter 24 may also be amplitude-modulated at an audio frequency, provided the audio frequency is different from the frequencies used in the localizer and glide path beams 19, 21, 22, and 23. For example, as illustrated in Fig. 10, I may provide a circular pattern transmitter 24' which is frequency modulated merely to prevent interference patterns of the localizer transmitter 15 and which is amplitude-modulated at a distinguishable audio frequency such as 5,000 cycles per second. In this case the transmitter 24' may have a carrier of the same radio frequency as the localizer transmitter 15.

A modified receiver 27' may be employed at which there is an additional audio frequency pickoff from the detector 47 of the localizer channel 36. A high gain audio amplifier 128 is provided with an input connection 129 from the detector 47 and an output connection to a 5,000 cycle band pass filter 131. The band pass filter 131 is provided with a full wave output rectifier 132 which is connected to the contacts of the relay apparatus 52, which control the connections to the localizer winding of the cross-pointer meter 31.

In order to obtain a zero indication from the output of the band pass filter 131 when the aircraft is flying along the circle 12, a source of balancing voltage 133 of opposite polarity from the rectifier 132 is preferably provided. The rectifier 132 and the balancing voltage source 133 have output resistors 134 and 135 and a junction terminal 136 connected through a conductor 137 to the localizer winding control contacts 93 of the relay 52.

The apparatus of Fig. 10 is so designed that when the audio voltage output of the detector 47 has insufficient strength to operate the AVC detector 49, the signal supplied by the high gain audio amplifier 128 will produce operation of the localizer winding 77 (Fig. 8) of the cross pointer instrument 31 for holding the aircraft on a constant-intensity signal or circular course 57. It will be observed that the high gain audio amplifier 128 is not subject to the AVC detector 49. When the aircraft enters the localizer beams 19 and 21, however, the AVC detector 49 is energized, causing the relay 52 to switch the aircraft landing connection and the aircraft is caused to descend along the landing path 14 as previously described.

I have herein shown and particularly described certain embodiments of my invention and certain methods of operation embraced therein for the purpose of explaining its principles of operation and showing its application, but it will be obvious to those skilled in the art that many modifications and variations are possible, and I aim, therefore, to cover all such modifications and variations as fall within the scope of my invention which is defined in the appended claims.

What is claimed is:

1. An aircraft landing system comprising, in combination with beam projecting localizer and glide path transmitters, a circular pattern transmitter, receiving apparatus for mounting on aircraft and comprising separate channels responsive to localizer and glide path transmission, apparatus controlled by the outputs of said channels responsive to deviation from a predetermined course demarked by beams of the transmitting apparatus, a constant-altitude reference-voltage source, the localizer channel comprising a signal detector, an automatic volume control detector adapted to operate when signal input to the receiving apparatus approaches a predetermined value, and a relay controlled by said automatic volume control detector, said relay including double-throw contacts for alternatively switching the deviation-responsive apparatus from the outputs of the said glide path and localizer channels, respectively, to said constant altitude reference voltage source and to the signal detector of the localizer channel, whereby the receiving apparatus is responsive to the strength of radiations from the circular pattern transmitter for causing the aircraft to fly a constant signal-intensity course until the aircraft has entered the beam of the localizer transmitter.

2. An aircraft landing system comprising localizer and glide path beam projecting transmitters modulated with distinctive signals, a circular pattern transmitter, receiving apparatus for mounting on an aircraft, said receiving apparatus comprising localizer and glide path channels responsive respectively to the localizer and glide path transmitter signals, and apparatus controlled by the respective outputs of said channels responsive to aircraft deviation from localizer and glide path transmitter beams, the localizer channel including means responsive to signal reception from the localizer transmitter for rendering the deviation-responsive apparatus responsive to the circular pattern transmitter when the aircraft is out of the beam of the localizer transmitter and responsive to the localizer transmitter when the aircraft is in the beam thereof.

3. An aircraft landing system comprising a localizer transmitter for radiating a beam of signal modulated radio energy defining a substantially vertical plane along an intended aircraft landing path, a circular pattern transmitter for radiating energy substantially uniformly in all directions with respect to a horizontal plane, and aircraft-mounted receiving apparatus comprising a signal detector, apparatus adapted to be controlled by said detector output responsive to aircraft deviation from the plane defined by said localizer transmitter, an automatic volume control detector responsive to the intensity of the received energy, and a relay controlled by the automatic volume control detector for rendering the deviation responsive apparatus subject to the control of the localizer transmitter when the aircraft is in the beam thereof and otherwise subject to the energy received from the circular pattern transmitter.

4. An aircraft landing system comprising a transmitter for radiating radio energy demarking a localizer plane, a transmitter for radiating radio energy delineating an approach path to the localizer plane, a receiver for receiving energy from said transmitters and supplying it to separate circuits, a course deviation indicator, and switching means responsive to one of said circuits for alternatively connecting said circuits to said indicator.

5. An aircraft receiver for an aircraft landing system, comprising a high frequency channel, a signal detector responsive thereto and producing two outputs, one dependent on high frequency wave intensity and one dependent on modulation-signal intensity, a course deviation indicator responsive to detector signal output, an automatic volume control detector controlled by detector signal output, a relay controlled by the automatic volume control detector, and connections controlled by the relay for alternatively connecting the course deviation indicator to the detector signal output and the detector high-frequency wave strength indicating output, whereby the aircraft is enabled to fly a circular constant intensity course in response to the circular pattern transmitter until it reaches a localizer beam, whereupon it is enabled to fly a localizer landing path in response to the detector signal output.

6. An aircraft receiver for an aircraft landing system, comprising a high frequency channel, a detector having two output connections, one for reproducing modulation signals and the other for reproducing carrier level, an automatic volume control detector, a relay controlled thereby, and a course deviation indicator with alternative connections controlled by the relay, said alternative connection being to the modulation signal output and to the carrier level output of said detector.

7. In a course-indicating radio receiver, a high frequency channel for receiving modulated carrier waves, a detector responsive thereto for recovering carrier modulation and reproducing carrier level with separate output connections therefor, a relay responsive to modulation strength, and a course deviation indicator with alternative connections controlled by said relay to the modulation signal output of the detector and the carrier level output of the detector.

8. In radio receiving apparatus, the combination of a detector, an audio level-responsive device controlled thereby, a current-responsive device, and means responsive to said audio level-responsive device for alternatively connecting said current-responsive devices to the modulation output or the carrier level output of the detector according to audio level.

9. In a radio receiver for receiving a modulated carrier and having circuits carrying currents dependent upon modulation level and carrier level, an automatic volume control detector controlled by modulation level, a current-responsive device, and means controlled by said automatic volume control detector for alternatively connecting said current-responsive device to the modulation level or the carrier level circuits.

10. A radio receiver for receiving a modulated carrier, comprising a circuit carrying current dependent upon the modulation level, a current-responsive device adapted to be controlled by said current, and means responsive to the modulation level for disconnecting said current-responsive device.

11. In a radio receiver for receiving a modulated radio frequency carrier having a responsive device alternatively controlled by carrier level and modulation level, a relay responsive to carrier level for disconnecting the responsive device so long as carrier level remains below a predetermined value.

12. In an aircraft receiver for an aircraft landing system, a channel responsive to a carrier modulated at two frequencies with means for producing currents dependent upon carrier level, dependent upon first modulation frequency level and dependent upon second modulation frequency level, a relay controlled by current representing first frequency modulation level, and apparatus responsive to course deviation controlled alternatively by carrier level current and by the relative magnitudes of modulation frequency level currents, said relay being connected to switch the control of said deviation-responsive apparatus according to the strength of said first frequency modulation.

13. An aircraft landing system comprising, in combination, means for projecting two radio frequency beams at small angles either side of a localizer plane in which an aircraft is intended to be landed, means for modulating the beams at two different frequencies, and means for radiating radio frequency energy of substantially equal intensity in all directions from the vicinity of a field at which an aircraft is to be landed, means on the aircraft responsive to carrier level for guiding the aircraft in a circular path to the localizer plane and responsive to relative strength of modulation for guiding the aircraft along the localizer plane after it has reached the plane, and a relay responsive to the modulation level of the far beam for changing the response of the aircraft from carrier level to relative modulation strength.

14. An aircraft landing system comprising, in combination, a localizer transmitter with audio frequency amplitude modulation, a circular pattern transmitter with audio frequency modulation at a different frequency referred to as the circular pattern modulation frequency, an aircraft receiver including a detector, a receiver circuit responsive thereto for selectively receiving localizer modulation, a receiver circuit responsive to the detector for selectively receiving circular pattern modulation frequency, a course deviation indicator, a relay for alternatively connecting said indicator to one or the other of said audio frequency circuits, and means responsive to the level of the localizer modulation for controlling said relay.

15. In an aircraft landing system, the combination of a localizer transmitter for projecting beams along a localizer plane in which an aircraft is to be landed, and modulating said beams at predetermined audio frequencies, a circular pattern transmitter for radiating radio frequency energy of substantially equal intensity in all directions, and modulating the same at a different frequency from the localizer transmitter modulations for producing separable signals to guide an airplane along a localizer plane and along a circular track to said plane.

16. In an aircraft landing system an aircraft receiver, responsive to modulation level of a received carrier, having different modulations referred to a localizer modulation and circular pattern modulation, means for separating localizer modulation, means for separating circular pattern modulation, a course indicator, and a relay responsive to level of localizer modulation for switching said indicator for circular pattern modulation output to localizer modulation output.

17. In an aircraft receiver for an aircraft landing system, a channel responsive to modulation of a received carrier, a second channel unaffected by said modulation, a course deviation indicator, means responsive to the modulation level in said channel for alternatively connecting said indicator to said first channel for guiding an aircraft along a landing path and connecting said indicator to said second channel for guiding the aircraft toward the landing path.

18. An aircraft navigating system comprising a localizer transmitter for radiating radio energy defining a substantially vertical plane, a substantially non-directional transmitter for radiating radio energy forming a constant intensity approach course to said plane, a receiver mounted on an aircraft for receiving energy from said transmitters and for supplying said energy to localizer-responsive and non-directional transmitter-responsive circuits, a course deviation indicator, and switching means responsive to a predetermined intensity of energy in one of said circuits for connecting said localizer-responsive circuit to said indicator and for disconnecting said non-directional transmitter-responsive circuit.

19. An aircraft navigating system comprising directive transmitting means for radiating radio energy defining a landing path, substantially non-directive transmitting means for radiating radio energy forming a constant intensity approach course to said path, a receiver mounted on an aircraft for receiving energy from said plurality of transmitting means and for supplying said energy to a first and a second circuit responsive to said directive and non-directive transmitting means, respectively, a course deviation indicator, and switching means responsive to a predetermined intensity of energy in one of said circuits for connecting said first circuit to said indicator and for disconnecting said second circuit.

WAYNE G. ABRAHAM.

REFERENCES CITED

The following references are of record in the file of this patent:

UNITED STATES PATENTS

| Number | Name | Date |
|---|---|---|
| 1,861,462 | Trouant | June 7, 1932 |
| 2,151,747 | Conrad | Mar. 28, 1939 |
| 2,179,499 | Diamond | Nov. 14, 1939 |
| 1,370,688 | Hammond, Jr. | Mar. 8, 1921 |
| 1,787,992 | McIlvaine | Jan. 6, 1931 |
| 2,133,285 | Dunmore | Oct. 18, 1938 |

FOREIGN PATENTS

| Number | Country | Date |
|---|---|---|
| 115,055 | Australia | Apr. 23, 1942 |